United States Patent
Kulkarni

(10) Patent No.: US 8,958,806 B2
(45) Date of Patent: Feb. 17, 2015

(54) RADIO RESOURCE MANAGEMENT IN FEMTOCELLS

(75) Inventor: Parag Gopal Kulkarni, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 68 days.

(21) Appl. No.: 13/113,439

(22) Filed: May 23, 2011

(65) Prior Publication Data

US 2011/0294514 A1    Dec. 1, 2011

(30) Foreign Application Priority Data

May 28, 2010  (GB) .................................. 1009055.3

(51) Int. Cl.
- H04W 72/00 (2009.01)
- H04W 72/04 (2009.01)
- H04W 28/04 (2009.01)
- H04W 72/08 (2009.01)
- H04W 84/04 (2009.01)
- H04W 92/20 (2009.01)

(52) U.S. Cl.
CPC .......... *H04W 72/0426* (2013.01); *H04W 28/04* (2013.01); *H04W 72/082* (2013.01); *H04W 84/045* (2013.01); *H04W 92/20* (2013.01); *Y02B 60/50* (2013.01)
USPC ......... 455/450; 455/114.2; 370/330; 370/332

(58) Field of Classification Search
None
See application file for complete search history.

(56) References Cited

U.S. PATENT DOCUMENTS

| | | | |
|---|---|---|---|
| 2007/0097939 A1* | 5/2007 | Nylander et al. | 370/338 |
| 2009/0257390 A1* | 10/2009 | Ji et al. | 370/329 |
| 2009/0268684 A1* | 10/2009 | Lott et al. | 370/329 |
| 2009/0316649 A1 | 12/2009 | Chen | |
| 2010/0054237 A1* | 3/2010 | Han et al. | 370/350 |
| 2010/0111022 A1 | 5/2010 | Chang et al. | |
| 2010/0197338 A1* | 8/2010 | Bonneville et al. | 455/522 |
| 2010/0216486 A1* | 8/2010 | Kwon et al. | 455/452.2 |
| 2011/0105135 A1* | 5/2011 | Krishnamurthy et al. | 455/450 |
| 2011/0111779 A1* | 5/2011 | Krishnamurthy et al. | 455/501 |
| 2011/0116480 A1* | 5/2011 | Li et al. | 370/332 |
| 2011/0136494 A1* | 6/2011 | Kim et al. | 455/450 |

(Continued)

FOREIGN PATENT DOCUMENTS

| | | |
|---|---|---|
| CN | 101707795 | 5/2010 |
| WO | WO 2009/099471 A3 | 8/2009 |
| WO | WO 2010/000695 A1 | 1/2010 |

OTHER PUBLICATIONS

Office Action issued Jan. 8, 2013, in Japanese Patent Application No. 2011-120158 (with English-language Translation).

(Continued)

*Primary Examiner* — Magdi Elhag
(74) *Attorney, Agent, or Firm* — Oblon, Spivak, McClelland, Maier & Neustadt, L.L.P.

(57) ABSTRACT

Certain embodiments provide a Femtocell base station arranged to receive interference notifications from another Femtocell base station and to send an interference remedial command to the other Femtocell base station and/or to one or more further Femtocell base stations.

6 Claims, 5 Drawing Sheets

(56) References Cited

U.S. PATENT DOCUMENTS

| | | | |
|---|---|---|---|
| 2011/0158168 A1* | 6/2011 | Chen et al. | 370/328 |
| 2011/0249642 A1* | 10/2011 | Song et al. | 370/329 |
| 2011/0255486 A1* | 10/2011 | Luo et al. | 370/329 |
| 2011/0292890 A1* | 12/2011 | Kulkarni et al. | 370/329 |
| 2012/0157110 A1* | 6/2012 | Stjernholm et al. | 455/450 |
| 2012/0263067 A1* | 10/2012 | Kim et al. | 370/252 |
| 2013/0064218 A1* | 3/2013 | Sundaresan et al. | 370/330 |
| 2013/0137447 A1* | 5/2013 | Zhang et al. | 455/452.1 |
| 2014/0092882 A1* | 4/2014 | Sankar et al. | 370/336 |

OTHER PUBLICATIONS

Nokia Siemens Networks, Nokia, Inter eNB Over-the-Air Communication (OTAC) for LTE-Advanced, R1-091777, 3GPP, Apr. 8, 2009, 5 pgs.

Telecom Italia, RRM Architectures Summary and Comparison, R3-060192, 3GPP, Feb. 17, 2006, 5 pgs.

Patents Act 1977: Examination Report Under Section 18(3), Application No. GB1009055.3, Oct. 11, 2012, 3 pgs.

Combined Search and Examination Report Under Sections 17 and 18(3), Application No. GB1009055.3, Sep. 28, 2010, 7 pgs.

* cited by examiner

Table 1: Resource Usage Tracking Table

|          | RB 0 | RB 1 | RB 2 | ... | RB 'n' |
|----------|------|------|------|-----|--------|
| Femto 1  | 1    | 0    | 0    | ... | 1      |
| Femto 2  | 0    | 0    | 1    | ... | 1      |
| Femto 3  | 1    | 1    | 0    | ... | 0      |
| ...      | ...  | ...  | ...  | ... | ...    |
| Femto 'n'| 0    | 0    | 0    | ... | 0      |

Table[i][j] = 1 means Resource Block (RB) 'j' is ALLOCATED to Femto 'i'.
Similarly Table [i][j] = 0 indicates that Resource Block 'j' is 'NOT ALLOCATED' to Femto 'i'

Fig. 4

| ID   | Strength |
|------|----------|
| ID#1 | AA       |
| ID#2 | BB       |
| ID#3 | CC       |
|      | ⋮        |
| ID#M | MM       |
|      |          |

Fig. 5A

| ID   | Strength | 1 | 2 | 3 | 4 | 5 | ... | N |
|------|----------|---|---|---|---|---|-----|---|
| ID#1 | AA       | 1 | 0 | 0 | 0 | 0 | ... | 1 |
| ID#2 | BB       | 0 | 0 | 0 | 0 | 1 | ... | 0 |
| ID#3 | CC       | 0 | 0 | 0 | 0 | 0 | ... | 0 |
|      |          |   |   |   |   |   |     |   |
| ID#M | MM       | 1 | 1 | 1 | 1 | 1 |     | 1 |

Fig. 5B

RADIO RESOURCE MANAGEMENT IN FEMTOCELLS

FIELD

Embodiments described herein relate to the management of radio resource in a system comprising a plurality of Femtocell base stations.

BACKGROUND

Femtocell base stations, which are also referred to as Home base stations or Home nodeBs or Home eNodeBs when they are implemented in 3GPP systems, are base stations with limited range, for example with a transmission radius of only 10 m, for use in indoor environments to improve coverage and capacity. Femtocell base stations have a limited range e.g. limited to a home or office area. As a consequence of this small coverage area a network employing Femtocells can reuse frequencies (or more generally resource blocks) more often and thus has increased capacity when compared to a network using larger cells.

Besides these benefits to network operators, Femtocells can also be of benefit to the end user as they can provide network coverage in areas that would be devoid of such coverage in the absence of the use of such Femtocells, for example in buildings through which propagation of an outside network is impeded. The use of Femtocell base stations is especially attractive for homes where the signal from the macro-cell may not be able to penetrate the home, for example due to difficult radio propagation conditions. In situations where a Femtocell base station provides network coverage in an area any user equipment in the covered area may establish a connection to the Femtocell base station, rather than to an also available macro-cell base station, thereby achieving improved connection. This not only helps to offload traffic off the macro-cell but also creates more capacity on top of what the macro-cell has to offer. Reduced load on the existing macro network by offloading traffic to Femtocells helps to improve performance of the macro cell users. At the same time the capital and operating expenditure of the network operator is reduced.

Capacity improvements in the home can moreover assist network operators in rolling out competitive pricing plans e.g. unlimited usage at flat rates to compete with fixed line telephones. The use of Femtocell base stations can be incentivised. Network operators may, for example, be able to reduce call charges, possibly even to such an extent that they are free of charge to the customer, associated with the use of Femtocells, as such use will result in better performance/improvement in capacity at a cheaper price/lower usage rates. Thus both the customer and the operator may benefit from the use of Femtocells.

Femtocells are designed to be customer premises equipment. Because of the small coverage area of Femtocells a large number of Femtocell base stations may be operated simultaneously, having been deployed in an ad hoc fashion. In contrast to the manner in which traditional cellular networks are operated it may thus not be possible to carry out elaborate network planning for Femtocells.

As the cost associated with the installation of Femtocell base stations by a skilled technicians is prohibitive Femtocell base stations are moreover likely to be installed by end users, most of whom may not appreciate the technical aspects of the installation. Femtocell bases stations are consequently expected to be plug and play type devices that self configure and self optimize during setup and operation.

Once a Femtocell base station powers on, there are several tasks that it needs to perform. Firstly a network operator's networks need to be discovered and the Femtocell base station needs to register itself with a thus discovered network. Registration involves the sending of the Femtocell base stations credentials to an authentication server of a discovered network. The authentication server then authenticates the Femtocell base station. Subsequent to successful authentication, the operator's network sends initial configuration parameters. The time-tested standard TR-069 titled "CPE WAN Management Protocol" from the DSL forum, which is herein incorporated by this reference in its entirety, may be used for authentication.

The initial configuration of Femtocell base stations does not include operational aspects related to Radio Resource Management (RRM), which comprises interference management. RRM solutions in which the transmit power of a Femtocell base station is altered so as to reduce interference and independently from and without coordination with other Femtocell base stations are known.

Such standalone solutions, where Femtocell base stations act independently from each other, may not always be able to provide a stable management of radio resources. If two or more Femtocell base stations independently change operating frequency without coordination to the same new operating frequency, this new frequency is the same for two or more Femtocell base stations then the changes made by the Femtocell base stations may not have solved the interference problem. Instead the problem may have been compounded.

Networks employing Femtocell base stations that manage interference in the above described manner may work well in circumstances exhibiting sparse deployment or low levels of traffic. Such networks may, however, not perform well under dense deployment scenarios or if there is significant contention for resources. In the latter situations it may be more desirable to coordinate interference management between Femtocell base stations.

BRIEF DESCRIPTION OF THE DRAWINGS

Embodiments will in the following be described by way of example only and with reference to the accompanying drawings, in which:

FIG. 4 illustrates an example of a resource block usage table;

FIG. 5A shows an example of a neighbouring list;

FIG. 5B shows another example of a neighbouring list;

DETAILED DESCRIPTION

Figure 1:
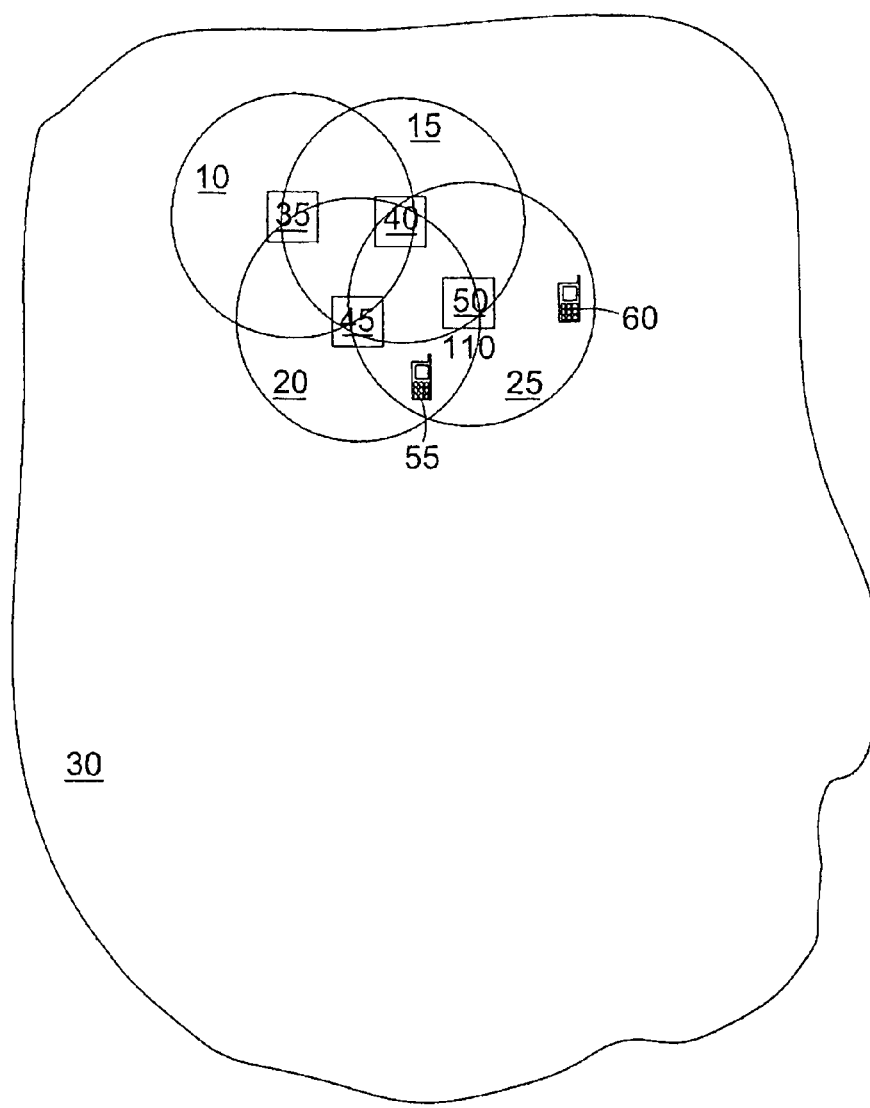
FIG. 1 shows an exemplary network comprising a plurality of Femtocells base stations.

For the purpose of this description, a Femtocell base station (or home NodeB/home eNodeB in the 3GPP LTE parlance, hereinafter referred to 'HNB'), is considered to be a small-scale user-deployed base station supporting a restricted (relative to a full-sized cellular base station) number of connected terminals, offering coverage using licensed spectrum in a small volume approximately the size of a single home. Femtocell base stations have a limited range, for example with a transmission radius of as little as 10 m, for use in indoor environments to improve coverage and capacity. The Femtocell base station may connect via a broadband connection, such as a home broadband connection, to a network operator's infrastructure over the Internet. References to Femtocell base stations are intended to include the above referenced HNBs as well as limited size cells based on Wireless Metropolitan Area Network technologies, such as WiMAX.

According to an embodiment there is provided a system comprising a plurality of Femtocell base stations in communicative contact with each other via a control channel. The Femtocell base stations are arranged to exchange information suitable for controlling a Femtocell base station via said control channel.

The plurality of Femtocell base stations that may be those Femtocell base stations that are within transmission range of each other. One Femtocell base station may, for example, assume responsibility for the management of resources of the Femtocell base stations it is in communicative contact. Femtocell base stations may transmit beacons at predetermined intervals. Other Femtocell base stations within transmission range from the beaconing Femtocell base station can detect the transmitted beacons and generate an internal list of all of the Femtocell base station it is in communicative contact with. During initialisation the Network Management System may alternatively or additionally provide a list of neighbouring Femtocell base stations. Updates of this list may be provided when additional Femtocell base stations become active.

A control channel may be or comprise any means by which Femtocell base stations can exchange information suitable for controlling the operating parameters of one or more of the Femtocell base stations in the network that can communicate with each other through the control channel. A control channel may, for example, be a frequency band or time slot reserved for the exchange of control information, a code associated with the transmission of control information or any other means by which information for the control of operating conditions in one or more of the Femtocell base stations within the system can be exchanged or transmitted. A control channel may, for example be implemented by using a particular message format that is recognised by the Femtocell base stations as comprising control information. The control channel may, in one embodiment, moreover make use of a number of resource blocks from among the resource blocks available to a Femtocell base station for data transmission.

Control information may be any information or command that is suitable for influencing or controlling operating parameters of a Femtocell base station, in particular such commands and information suitable for influencing or controlling the way such a Femtocell base station or a plurality of Femtocell base stations allocate resource blocks for the communication with user equipment. Control information may also be of a nature that governs the level of transmit power one or more of the Femtocell base stations use when communicating with user equipment. The adjustment of transmit power can be of particular importance if interference is caused by the simultaneous use of one or more resource blocks by two Femtocell base stations.

The preferred embodiments are not limited to the above mentioned system comprising a plurality of Femtocell bases stations but also extends to the individual Femtocell bases stations that can be used in such a system. According to a preferred embodiment there is thus provided a Femtocell base station arranged to establish a control channel for the exchange of control information with an equivalent Femtocell base station or to join an existing such control channel within a network. The Femtocell base station may further be arranged to transmit control information onto and/or to receive control information from the control channel.

The Femtocell base station may moreover be arranged to establish the control channel when it powers up and/or when it connects to a network operator's network. The control channel may be maintained continuously for a period of time, for example until the Femtocell base station powers down.

The Femtocell base station may comprise a receiving means for receiving information for establishing the control channel from a network operator's Network Management System. The Femtocell base station may be arranged to establish the control channel based on information received from the network operator's Network Management System. The network operator's Network Management System may, for example, provide a frequency, frequency band, time slot information or code, or, put more generally, a resource block or resource blocks that is/are to be used to establish the control channel. The control channel that is established may be a new control channel that does not exist when the Femtocell base station tries to access it so that the control channel is generated by the Femtocell base station to allow other Femtocell base stations to exchange control information. It can be envisaged that such a new control channel needs to be established in situations where the Femtocell base station is the first Femtocell base station that contacts a network operator's Network Management System and where other Femtocell base stations that make this contact later can then join in an exchange of control information on this control channel. In this case the list of neighbouring Femtocell base stations received from the network operator's network management system may not specify any neighbouring Femtocell base stations. The above discussed establishing of the control channel, however, also encompasses the joining of an already existing control channel, for example by a Femtocell base station that contacts a network operator's Network Management System after another Femtocell base station has done so and has established the control channel, as referred to above.

The control channel may be established via an air interface to allow direct communication between Femtocell base stations, or via the backhaul, so that Femtocell base stations can communicate indirectly. The latter way of establishing the control channel enables Femtocell base stations that may only be able to establish an unreliable connection via an air interface to communicate with each other in a more reliable fashion. A control channel established via the air interface may be operating in the licensed or the unlicensed spectrum.

A Femtocell base station may further be arranged to wirelessly send a message requesting receipt of reply message that comprises an identifier of Femtocell base stations that have received the message. The Femtocell base station may determine the signal strength of a received return message and store the identifier of the received return message alongside the determined signal strength. The message may be sent using a carrier sense multiple access scheme. Alternatively the message may be sent and/or the reply message may be received as a broadcast beacon according to the IEEE 802.11 specification of a WLAN system or in a beacon slot according to IEEE 802.15.3a.

The Femtocell base station may further be arranged to transmit a notification of an interference onto the control channel, so that other Femtocell base stations operating using the control channel may receive the notification. The Femtocell base station thus does not rely on user equipment for forwarding an interference notification, as is the case in some known systems. The interference notification may, however, be sent following the receipt of a measurement report from user equipment.

The Femtocell base station may further comprise a receiving means or a receiver for receiving control messages from another Femtocell base station via the control channel and a controller that is arranged to execute a command received via a said control message.

The preferred embodiments are not limited to hardware arranged to establish and/or operate a control channel and also extends to methods of operating such hardware/Femtocell base stations and systems comprising such Femtocell base stations. According to another preferred embodiment there is thus provided a method of managing a plurality of Femtocell base stations. The method includes establishing a common control channel between the plurality of Femtocell base station to enable the exchange of control messages between the plurality of Femtocell base stations. The control messages may comprise commands that can readily be interpreted by a receiving Femtocell base station, wherein the command is of a nature that can control an operating condition of the receiving Femtocell base station.

According to another preferred embodiment there is provided a method of operating a Femtocell base station. The method comprises establishing a control channel enabling communication of the Femtocell base station with one or more other Femtocell base stations or joining an existing control channel enabling such communication. The method may further comprise transmitting to and/or receiving control information from the control channel.

A local resource manager for co-ordinating a response to a resource block management problem and/or an interference problem in a centralised fashion may further be used. Such a local resource manager may keep a record of resource blocks allocated by a number of Femtocell base stations to data transmission, for example to and from user equipment, to make it easier for an adequate way of addressing the problem to be found. The local resource manager may, for example store information that enables the identification of the source of an interference problem. The simultaneous use of the same resource block by two Femtocell base stations that have overlapping areas of coverage may, for example be such a source or cause of an interference and can be identified by a simple comparison of the resource blocks used for data transmission by the Femtocell base stations "managed" by the local resource manager. The local resource manager may be a Femtocell base station itself. The local resource manager may further or instead be a means that is arranged to determine an action that is likely to cause a re-direction of the problem and to send a message including a command suitable for putting this action into effect to other Femtocell base stations, for example via the control channel. The action can be determined based on information stored by the local resource manager, such as the information referred to above. The information regarding resource blocks that are in use that is stored by the local resource manager may relate to those resource blocks allocated by those Femtocell base stations that are within transmission range of the local resource manager. The local resource manager may comprise a list of the Femtocell base stations that are in communicative contact with it. This list may be created and updated following and based on the receipt of beaconing signals transmitted by other Femtocell base stations, if such other Femtocell base stations transmit frequent beaconing signals. The local resource manager may alternatively base its operation on a list of Femtocell base stations received from a network operator's Network Management System. The local resource manager may of course also store information relating to the resource blocks the local resource manager itself has allocated for communication. When referring to information relating to allocated resource blocks, information relating to a transmit power used by Femtocell base stations in general and/or for transmissions using a particular resource block, or particular resource blocks in particular, may also be maintained/stored by the local resource manager.

According to another preferred embodiment there is provided a Femtocell base station comprising a controller arranged to query the presence of a Femtocell base station acting as a local resource manager. The controller may, for example, be arranged to send a query requesting information on whether or not another Femtocell base station acts as local resource manager to a network operator's network resource manager. The network operator's network resource manager may, in return provide an indication of other Femtocell base stations operating in the vicinity of the querying Femtocell base station and whether any one of any such other Femtocell base stations already fulfils the function of the local resource manager. The Network Resource Manager may, for example establish if one of the Femtocell base stations in the list of neighbouring Femtocell base stations acts as a local resource manager.

A local resource manager may be a Femtocell base station that may be arranged to monitor the use of communication and/or transmission resource blocks that are available to Femtocell base stations for communication. The local resource manager may additionally or instead be a Femtocell base station that is arranged to send control information, control messages or control commands to other Femtocell base stations, for example via a control channel provided for this purpose. The control information/messages/commands may be designed to be interpreted by other Femtocell base stations (which may be of the same or similar type as the Femtocell base station that acts as the local resource manager) as commands or instructions to allocate particular resource blocks or change an already existing allocation of resource block to a particular communicative connection, for example so that other resource blocks are used for operating the communicative connection.

The use of a local resource manager avoids the scalability problems associated with a purely centralised solution operating at the network operator's Network Management System as the number of Femtocells that could potentially belong to an overlapping interference region would be much smaller due to the localised effect of interference.

The use of a local resource manager may further allow a network operator's management system to influence the Femtocell base stations managed by the local resource manager through the local resource manager. Such influencing may be less computationally expensive for the Network Management System than having to influence each Femtocell base station separately, as would have to be the case in a completely distributed system that does not have a local resource manager that acts in the above described Master-Slave configuration.

The network operator's Network Management System is aware of the Femtocell base stations that operate in a particular area. The Network Management System can accordingly provide a reliable indication of the Femtocell base stations operating in the vicinity of a newly connecting Femtocell base station and of the functions such previously connected Femtocell base stations fulfil. The Network Management System may transmit a list of Femtocell base stations that operate in the vicinity of the newly registering Femtocell base station to the newly registering Femtocell base station upon connection. Updates indicating Femtocell base stations that have started operation later may be provided as the relevant information becomes available.

The Femtocell base station may further be arranged to establish or join the control channel for communication with other Femtocell base stations, as described above. This control channel may be established based on information received from a Network Management System of a network operator following the Femtocell's connection to the network. The presence or absence of a Femtocell base station acting as a local resource manager may be queried via said control channel.

The Femtocell base station may further be arranged to operate in a local resource managing mode in which a function for sending commands to other Femtocell base stations for resource management is enabled. This mode may be entered if the query provides no indication of the presence of a local resource manager. There may, for example, be no response to the query or a response to the query may indicate that there is no Femtocell base station that acts as a local resource manager known to the Network Management System. In this case the Femtocell base station takes over responsibility for managing the resources of itself and of any Femtocell base stations that may later start operating in the vicinity, for example as defined by the list of neighbouring Femtocell base stations received from the network operator's Network management System and by updates to this list.

The Femtocell base station may further or alternatively be arranged to operate in a command acceptance mode in which a function in which the Femtocell base station accepts and executes commands received from another Femtocell base station is enabled, should the query provide an indication of the presence of a local resource manager. In this case the Femtocell base station is in a mode in which it allows the local resource manager to direct the use of resource blocks via commands received from the local resource manager.

According to another embodiment there is provided a method of joining a network. The method is performed in a Femtocell base station and comprises connecting the Femtocell base station to a core network of a network operator and causing the Femtocell base station to send a query regarding the presence of a local resource manager via a control channel. The local resource manager may, for example, be another Femtocell base station.

The Femtocell base station may further be switched to a local resource managing mode in which a function for sending commands to other Femtocell base stations for resource management is enabled if a response to the query indicates that no Femtocell base station acts as a local resource manager or if no query response is received after a predetermined time. The method may alternatively comprise switching the Femtocell base station to a command acceptance mode in which a function in which it accepts and executes commands received from another Femtocell base station is enabled.

Femtocell base stations managed by a local resource manager so that the local resource manager may keep an up-to-date list of allocated resource blocks.

According to an embodiment there is provided a Femtocell base station arranged to receive messages from other Femtocell base stations indicating the allocation or de-allocation of a resource block by the other Femtocell base station and to maintain a record of resource blocks indicated as having been allocated by received messages. A record of allocated resource blocks relating to a resource block indicated as having been de-allocated by a received message may be removed from a record of allocated resource blocks following receipt of the message. This Femtocell base station consequently fulfils the above described monitoring function of the local resource manager. Keeping an-up-to date record of allocated resource blocks in a Femtocell base station enables providing a response to any interference problems that may arise. Such a response can be based on information relating to all Femtocell base stations that may be affected by the interference problem and/or all Femtocell base stations that may be contributing to the problem. The above described problems can thus be addressed in a centralised manner based on the up-to-date records.

It will be appreciated that the local resource manager needs other Femtocell base stations to notify the local resource manager of the allocation or de-allocation of resource blocks as they occur. According to another embodiment there is provided a Femtocell base station arranged to send, via a control channel, a control message for notifying another Femtocell base of an allocation or de-allocation of a resource block after said resource block has been allocated or de-allocated.

The local resource manager may also send commands controlling the allocation of resource blocks to other Femtocell base stations with which it is in communicative contact. According to another embodiment there is provided a system comprising a plurality of Femtocell base stations in communicative contact with each other, wherein one of the Femtocell base stations is arranged to manage or partially manage, in use, the allocation of resource blocks of two or more of the plurality of Femtocell base stations. Partial management may be management that is performed to overcome a problem, such as, for example an interference problem.

The Femtocell base station managing the resource block may be any of the above discussed Femtocell base stations. The resource block managing Femtocell base station and one or more further ones of the plurality of Femtocell base stations may be in communicative contact with each other via a dedicated common control channel.

According to another embodiment there is provided a method of operating a communication system comprising a plurality of Femtocell base stations. The method comprises allocating, in a first Femtocell base station, a resource block for signal exchange between the first Femtocell base station and equipment communicatively coupled to the Femtocell base station or de-allocating a previously allocated such resource block. The method further comprises sending a message from the first Femtocell base station to a second Femtocell base station. The message comprises information notifying the second Femtocell base station of the allocation or de-allocation of the resource block. A record of notified allocations is maintained in the second Femtocell base station. Such maintaining may comprise removing allocation information following the receipt of a message indicating the de-allocation of a resource block.

According to another embodiment there is provided a system comprising a plurality of Femtocell base stations, wherein one of the plurality of Femtocell base stations is arranged to, upon allocation or de-allocation of a resource block, transmit a message via a communication channel notifying another Femtocell base station from among the plurality of Femtocell base stations of the allocation or de-allocation of the resource block. The other of the Femtocell base station is arranged to maintain a record of allocated resource blocks.

The other Femtocell base station may further be arranged to, if a message received from the one Femtocell base station notifies the other Femtocell base station of the allocation of a resource block, include a record of the notified allocation of the resource block in the record of allocated resource blocks. The other Femtocell base station may moreover be arranged to, if a message received from the one Femtocell base station notifies the other Femtocell base station of the de-allocation of a resource block, remove an indication that the resource block has been allocated by the one Femtocell base station from the record of allocated resource blocks.

According to another embodiment there is provided a system comprising a plurality of Femtocell base stations, wherein at least one of the Femtocell base stations is arranged to maintain a record of resource blocks allocated by the Femtocell base stations of the plurality of Femtocell base stations.

According to another embodiment there is provided a method of managing the allocation of resource block in a system comprising a plurality of Femtocell base stations. The method comprises the allocation or de-allocation of a resource block by a Femtocell base station and the transmission of a message onto a communication channel to notify another Femtocell base station that maintains a record of allocated resource blocks of the allocation or de-allocation of the resource block by the Femtocell base station. The other Femtocell base station may be a managing Femtocell base station.

In case the notification indicates that a resource block has been allocated, the method may comprise including a record of the notified allocation of the resource block in the record maintained by the managing Femtocell base station. If the notification indicates the de-allocation of a resource block the method may comprise removing a record of a previous allocation of the resource block from the record maintained by the managing Femtocell base.

According to another embodiment there is provided a method of managing resource blocks comprising receiving at a Femtocell base station information of the allocation or de-allocation of a resource block and entering or removing a record of the allocation in or from a record of all notified resource block allocations.

It will be appreciated that, for example based on the records kept in the above described manner, it is possible to determine a remedial action for an interference problem that may be experienced by user equipment or by a Femtocell base station. According to another embodiment there is provided a Femtocell base station arranged to receive interference notifications from another Femtocell base station and to send an interference remedial command to the other Femtocell base station, to other Femtocell base stations or to one or more further Femtocell base stations. The interference remedial command thus does not have to be directed towards the Femtocell base station that has provided the original interference notification.

The Femtocell base station may be arranged to receive the interference notification via a dedicated signalling control channel, such as the above discussed signalling control channel, and/or be arranged to send the interference remedial command via a dedicated signalling control channel.

The Femtocell base station may further be arranged to determine, using a record of resource block that have been allocated by other Femtocell base stations, an action for reducing or eliminating an interference notified in said interference notification and to send a message for putting the determined action into effect in another Femtocell base station as part of the interference remedial command.

According to another embodiment there is provided a Femtocell base station arranged to receive interference notifications from another Femtocell base station and to determine, using a record of resource block that have been allocated by other Femtocell base stations, an action for reducing or eliminating an interference notified in said interference notification.

According to another embodiment there is thus provided a Femtocell base station arranged to receive an interference remedial message comprising or consisting of a command, the base station comprising a processor arranged to execute the command. The command may be a command to allocate, de-allocate or re-allocate a resource block used by the Femtocell base station. The command may thus, for example, be a command causing the Femtocell base station to change a resource block or resource blocks used in a communication link with user equipment to another resource block or to other resource blocks, thereby potentially avoiding an interference problem that the reallocation of the resource block is intended to alleviate. The command may alternatively or additionally be a command for the amount of power used by the Femtocell base station for one or more particular communicative connections to be altered. The command may, for example be a command for the transmit power used in communicating with one or more particular pieces of user equipment to be lowered, thereby again potentially reducing an interference problem.

Embodiments also extend to the Femtocell base stations from which an interference remedial command originates. According to another embodiment there is thus provided a Femtocell base station arranged to send, to another Femtocell base station, a command for the other Femtocell base station to allocate or reallocate a resource block or for the other Femtocell base station to alter a transmit power.

According to another embodiment there is provided a method of managing interference in a system comprising a plurality of Femtocell base stations. The method comprises directly sending a message from one Femtocell base station to another Femtocell base station via a dedicated control channel. The message provides details of an interference or an undesirable or insufficient service level experienced by or notified to the one Femtocell base station. A known interference can thus be notified to other Femtocell base stations, such as for example to a Femtocell base stations acting as a local resource manager, as discussed above, so that remedial action can be fashioned so that it coordinates responses to the interference problem between a number of the plurality of Femtocell base stations.

The method may further comprise determining an action for alleviating the interference or for improving the service level in the other Femtocell base station. This action may be determined in one of the Femtocell base stations receiving the interference notification via the dedicated control channel. The Femtocell base station determining the action may, for example, be a Femtocell base station acting as a local resource manager, as described above.

The method may further comprise sending a further message from the Femtocell base station that has received the interference notification via the control channel to the Femtocell base station that had originally sent the interference notification or to a further Femtocell base station. The further message may comprise a command for putting the action into effect in the receiving Femtocell base station or Femtocell base stations. The action may then be performed in the Femtocell base station that has received the message based on the contents of the message.

According to another embodiment there is provided a system comprising a first Femtocell base station and a second Femtocell base station. The first Femtocell base station is arranged to send a message to the second Femtocell base station. The message comprises a command for changing the allocation of a resource block used by the second Femtocell base station or for altering a transmit power used by the second Femtocell base station. The message may, for example, comprise a command for the second Femtocell base station to alter a transmit power used in one or more particular connections to user equipment or used in a particular data transmission. The first Femtocell base station may further be arranged to receive messages identifying an interference in data transmission, such as interference experienced by user equipment or by another Femtocell base station.

The first Femtocell base station may further be arranged to determine, based on a record of resource blocks allocated by Femtocell base stations with which the first Femtocell base station is in communicative contact, an action for reducing an identified interference. It will be appreciated that any such action may not guarantee that the interference is reduced or even eliminated. The action will however, be an action that is likely to lead to a reduction in or an elimination of the interference. The action may again be notified to the Femtocell base station that is to implement it in the form of a message transmitted from the first Femtocell to another Femtocell base station that is intended to put the action into effect.

According to another embodiment there is provided a system comprising a first Femtocell base station and a second Femtocell base station, the first Femtocell base station arranged to, in response to obtaining information of an interference, send a message identifying the interference to the second Femtocell base station. The second Femtocell base station is arranged to determine an action for reducing the identified interference. The action is determined based on a record of resource blocks allocated by Femtocell base stations with which the second Femtocell base station is in communicative contact.

According to another embodiment there is provided a method of managing interference in a system comprising a plurality of Femtocell base stations. The method comprises sending a message from one Femtocell base station to another Femtocell base station. The message comprises a command for execution by the other Femtocell base station, wherein the command is intended to alleviate a known interference or to improve a service level when executed by the other Femtocell base station. A command intended to alleviate an interference is one that, based on available information, is more likely to reduce a level of interference than it is to increase the level of interference or to keep it constant.

The method may further comprise determining a source of interference using a record of resource blocks that have been allocated by the plurality of Femtocell base stations. An action for alleviating the interference may be determined based on the record. A command for causing execution of the action in the other Femtocell base station may be included in the message. Execution of the command in the other Femtocell base station may alter the allocation of resource blocks within the other Femtocell base station and/or alter the transmit power of the other Femtocell base station.

The method may further comprise sending a message from the other Femtocell base station to the one Femtocell base station confirming execution of the command. A record may then be updated to reflect changes caused by the execution of the command. The record that is being updated may, for example, be a record of the resource blocks used by a plurality of Femtocell base station, including the other Femtocell base station, as discussed above. The record may additionally or alternatively be a record of a power level used in a particular data transmission.

According to another embodiment there is thus provided a Femtocell base station arranged to note an interference and to send information relating to the interference from the Femtocell base station onto a control channel established for exchanging control information.

Embodiments also extend to a method practiced in a system comprising a plurality of communicatively linked Femtocell base stations. According to another embodiment there is provided a method of interference management comprising receiving at a Femtocell base station information relating to an interference, determining a source of the interference from a record of resource blocks allocations, determining, based on the record, an action for alleviating the interference and generating a message for sending to another Femtocell base station. The message comprises a command suitable for causing execution of the action in the other Femtocell base station.

Embodiments also extend to a method of operating a Femtocell base station that receives a command intended to put into effect an action intended to alleviate or eliminate an interference situation. According to another embodiment there is thus provided a method of interference management. The method comprises receiving at a Femtocell base station a message comprising a command that, when executed in the Femtocell base station, causes a change in the allocation of resource blocks within the Femtocell base stations and/or a change in a transmit power level used for communicating with user equipment. The method further comprises executing the command in the Femtocell base station.

The change in allocation may comprise one or more of: changing one or more resource blocks allocated to user equipment and allocating a new resource block to user equipment. A message relating to the interference may be sent prior to receipt of the message comprising the command.

According to another embodiment there is provided a Femtocell base station comprising a memory and arranged to dynamically create and store a list of a plurality of neighbouring Femtocell base stations and, for two or more of the neighbouring Femtocell base stations, an indication of a likelihood that said neighbouring Femtocell base station causes interference, wherein Femtocell base station is arranged to, in use, create the list through direct wireless communication with another Femtocell base station of the same type. The likelihood that the neighbouring base station causes an interference may be expressed in terms of the signal strength the Femtocell base station storing the list receives from the listed Femtocell base station. The likelihood that the neighbouring Femtocell base station causes an interference may be different for different resource blocks and an individual indication of this likelihood may be stored for each resource block, so that the neighbouring Femtocell base station that is least likely to cause interference can be determined individually for each resource block.

The Femtocell base station may further be arranged to maintain a list of communication resources available for use by the Femtocell base station and to maintain a record of those said communication resources that have been allocated for communication by the said Femtocell base station or by one or more of the plurality of neighbouring Femtocell base stations. The Femtocell base station is in this case arranged to determine, based on the record, whether a the communications resource is unallocated upon receipt of a request for allocation of a communications resource or upon notification of an interference in an ongoing communications process. If an unallocated communications resource is determined to be available the Femtocell base station may be arranged to allocate the unallocated communications resource.

The Femtocell base station may further be arranged to allocate an already allocated communications resource to the ongoing communication process or to the request, wherein the Femtocell base station is arranged to select as the already allocated communications resource a communications resource indicated by the record as having been allocated by the said neighbouring Femtocell base that is least likely to cause interference.

The Femtocell base station may further be arranged to negotiate, the neighbouring Femtocell base station that is least likely to cause interference, a level of transmit power that is to be used for transmission on the already allocated communications resource.

According to another embodiment there is provided a Femtocell base station arranged to maintain a list of communication resources that are, in use, available to the Femtocell base station and a record of those of the communication resources that, in use, have been allocated for communication by the Femtocell base station or that have been reported as having been allocated for communication by another Femtocell base station. The Femtocell base station is arranged to determine, based on said record, whether a said communications resource is unallocated upon receipt of a request for the establishing of a communication link or upon determination of the presence of an interference in an ongoing communications process and, if an unallocated communications resource is determined to be available, to allocate said unallocated communications resource.

According to another embodiment there is provided a system comprising a plurality of Femtocell base stations, wherein one or more of the plurality of Femtocell base stations is as described above.

According to another embodiment there is provided a method of operating a system comprising a plurality of Femtocell base stations. The method comprises, in more than one of the Femtocell base stations, dynamically maintaining a list of communication resources allocated by the Femtocell base station maintaining the list and by one or more other Femtocell base stations from among the plurality of Femtocell base stations and checking based on the list and in response to the receipt of a request for the establishing of a communication link or upon determining the presence of an interference, whether or not an unallocated communication resource is available.

The method may further comprise maintaining an indication of the likelihood of interference of the neighbouring Femtocell base stations and allocating a communication resource that is indicated by the list as already being allocated in response to the receipt of the request or indication, wherein the communication resource allocated is a communication resource indicated by the list as having been allocated by the neighbouring Femtocell base station that is least likely to cause interference.

Any of the above described Femtocell base stations may be LTE Femtocell base stations.

The embodiments described in the following are based on the following assumptions:
 In some embodiments a list of neighbouring Femtocells base stations is passed as a configuration parameter during the configuration process initiated on power ON of a Femtocell. Femtocell base stations of some other embodiments, however, are arranged to generate the neighbouring list autonomously without support from the network operator.
 A control channel for the exchange of signalling/control information between Femtocell base stations in the list of neighbouring Femtocell base stations can be established or exists. This control channel may be created in any known way of creating a communications channel, for example directly between Femtocell base stations or via the backhaul IP network. The term control channel encompasses any such connection, as long as it is suitable for conveying control information between Femtocell base stations.
 For simplicity and without loss of generality it is assumed in some embodiments that the first Femtocell base station (from the list of neighbouring Femtocell base stations) to power ON will assume the responsibility of the local resource manager (LRM). There may be other ways of selecting/electing an LRM and these fall within the scope of the embodiments. Other criteria for the selection of a Femtocell base station as local resource manager may be hardware/processing capability of the Femtocell base station knowledge of the fact that a particular Femtocell base station remains switched ON for long periods (based, for example, on historical information) etc. Other embodiments described in the following do not comprise a local resource manager and instead manage resources in a distributed fashion, which several or all Femtocell base stations being arranged to make resource allocation decisions.
 Femtocell base station communicating in the arrangement described in the following belong to the same operator. The issue of non-compliance do therefore not arise and the described Femtocell base stations obey orders from the local resource managing Femtocell base station.

FIG. 1 illustrates a distributed system in which four Femtocells 10, 15, and 25 are located in a macrocell 30. Each Femtocell 10, 15, 20 and 25 is generated by a corresponding Femtocell base station 35, 40, 45 and 50 respectively. Also shown is user equipment 55 located in Femtocells 20 and 25. User equipment 60, located in Femtocell 25 is also shown. The user equipment 55 and 60 may be cellphones, PDAs, laptops etc. It will be appreciated that, if user equipment 55 is in communicative contact with Femtocell base station 45 using a particular communications resource, and if the Femtocell base station 50 uses the same communications resource to communicate with user equipment 60, then user equipment 55 will experience interference from Femtocell base station 50.

In the following two principal embodiments are described for alleviating interference. In the first principal embodiment a Femtocell base station can receive a list of neighbouring Femtocell base stations from the network operator, for example upon activation of the Femtocell base station. In another principal embodiment the Femtocell base stations can acquire the list of neighbouring Femtocell base stations in an autonomous fashion without the help of the network operator. The Femtocell base stations may be in communicative contact with each other via a control channel. Such a control channel may be associated with a particular frequency selected from an available frequency spectrum, a particular transmission timing, code or space.

One of the Femtocell base stations may act as a local resource manager, directing the resource allocation decisions made by other Femtocell base stations communicating with the local resource manager via the control channel, either for each allocation of a resource or in case of interference, when a coordinated allocation approach is desirable. Such a local resource manager exclusively operates as master in a master slave mode together with other Femtocell base station. Alternatively several or each of the Femtocell base stations may be arranged to allocate resources locally but taking into account the resource requirements of other Femtocell base stations.

The preferred embodiment reduces the risk of such interference by allocating communications resources based on knowledge of interference strength from neighbouring Femtocell base stations and/or knowledge of those communication resources that have already been allocated by a Femtocell base station.

Figure 2:
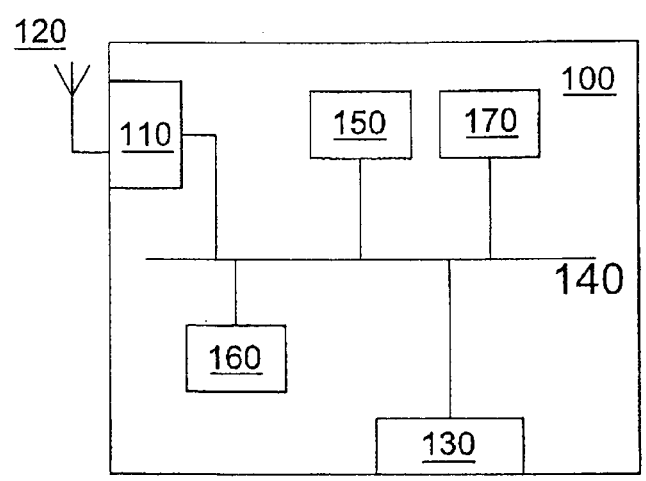
FIG. 2 illustrates the architecture of an exemplary Femtocell base station.

Each Femtocell base station 20 may be implemented in hardware as shown in FIG. 2. FIG. 2 illustrates the Femtocell as a wireless access point 100 comprising a medium access controller 110 for establishing a wireless connection to user equipment or to other Femtocell base stations using an antenna 120 and means 130 for connection to the backhaul, a WAN and/or a public land mobile network (PLMN). Medium access controller 110 and the means for connecting to the backhaul 130 are shown to be communicatively coupled to a communications bus 140. The Femtocell base station further comprises a processor 150 and a working memory, such as RAM and ROM, 160. Optionally additional input/output devices 170, such as for example for indicating an operating status or condition of the Femtocell base station to a user and/or to enable a user to input commands into the Femtocell base station are also provided. Resource allocation lists, neighbouring lists and interference lists, all discussed in more detail below, may be stored in the working memory 160.

Figure 3:
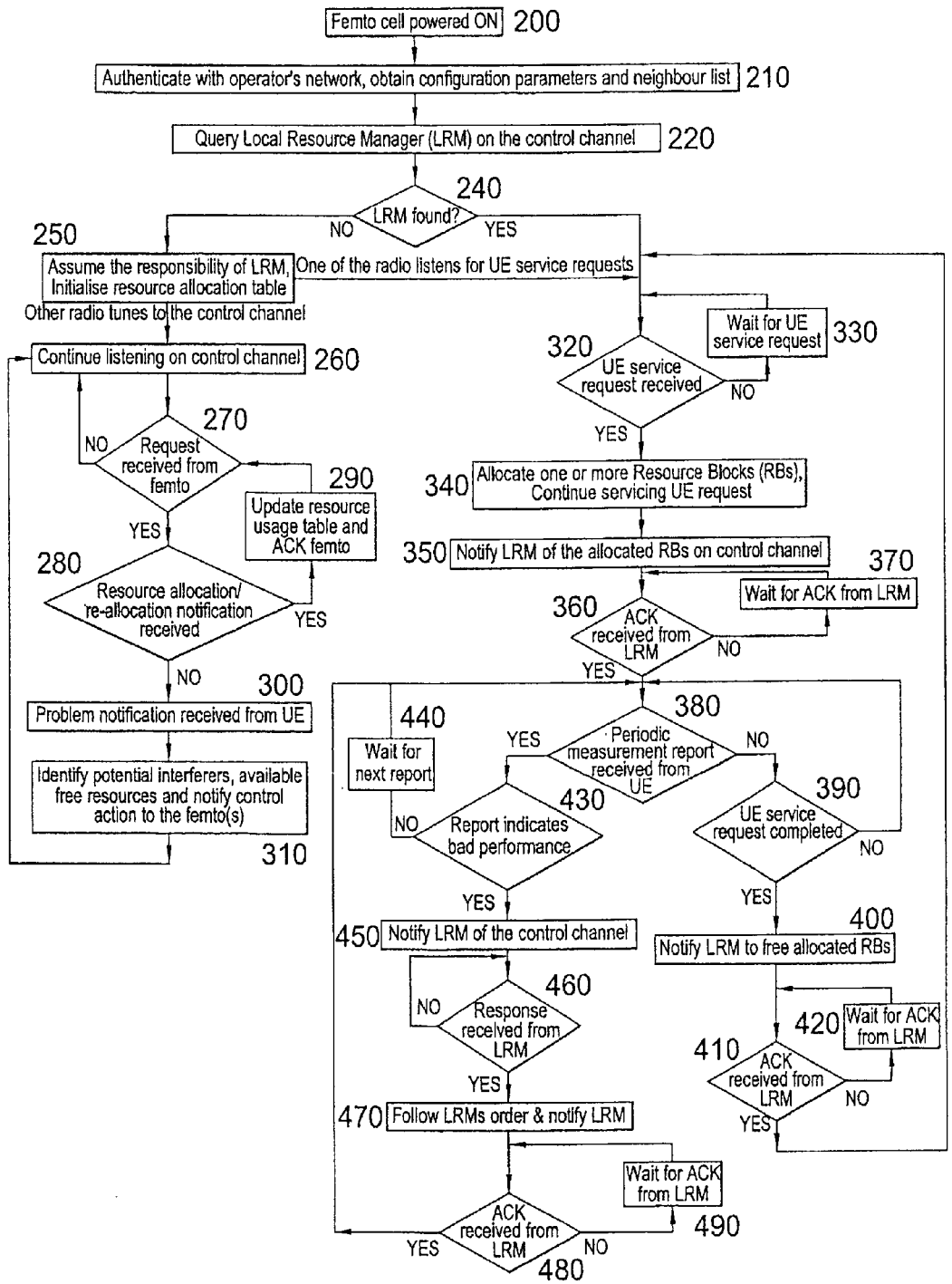
FIG. 3 illustrates an algorithm executed in an exemplary Femtocell base station.

Turning now to an embodiment in which one Femtocell base station, out of a plurality of Femtocell base stations, acts as a local resource manager that directs the allocation of resources by other Femtocell base stations out of the plurality of Femtocell base stations, FIG. 3 outlines the steps a Femtocell base station that is capable of acting as a local resource manager takes upon power up. At step 200 the Femtocell base station powers on. Subsequently a network operator's network is detected and the Femtocell base station authenticates itself with the detected network in step 210. As part of the authentication step the Femtocell base station obtains configuration parameters required for its operation within the network as well as a list of neighbouring Femtocells from the operator's Network Management System. The operating parameters comprise parameters that enable the Femtocell base station to establish a control channel for the exchange of control information with other Femtocell base stations connected to the operator's network. In step 220 the Femtocell base station sends a query on the control channel investigating whether another entity, such as another Femtocell base station, acts as a local resource manager. If in step 240 it is determined, for example based on the absence of an appropriate response to the query, that the function of local resource manager is not being performed by another entity the process moves to step 250, in which the Femtocell base station assumes responsibility for local resource management and initialises a resource allocation table. Once the Femtocell base station has assumed responsibility for local resource management, the Femtocell base station continues to monitor the control channel (in step 260) for messages from other Femtocell base stations and other channels for service requests from user equipment.

If another Femtocell base station powers up it will also send a query similar to the query sent in step 220. Such a query will be detected in step 260 and a response that the function of local resource manager is already being performed may be sent in response. Notifications from other Femtocell base stations are also detected in the monitoring step 260. If no notification is received monitoring continues. Upon detection of a notification in step 270 the Femtocell base station determines in step 280 whether or not the notification is a notification of the new allocation of resources, in which case the resource allocation table is updated in step 290 and monitoring continues in steps 270 and 260. If the notification is a notification of an interference the method proceeds to steps 300 and 310, wherein a note is made of the interference and the resource allocation table is consulted to identify, based on the knowledge of the resources that are being used by the managed Femtocell base stations, which changes will most likely eliminate or at least reduce the notified interference. The managed Femtocell base station or the managed Femtocell base stations that can make the identified change in resource allocation is/are then notified via the control channel to implement the identified resource reallocation. Continuous monitoring for a response from the so contacted Femtocell base station(s) will yield a response, if the contacted base station complies and notifies compliance. This permits an update of the resource allocation table in step 290 in the above described fashion. The process shown in FIG. 3 thus provides a means for local resource management in a network comprising a number of Femtocell base stations.

If in step 240 a message is received via the control channel indicating that the function of local resource manager is already being fulfilled by another Femtocell base station, then the process proceeds to steps 320 and 330, where channels are being continuously monitored for service requests from user equipment. A local resource managing Femtocell base station will notify the querying base station of its own list of local Femtocell base stations.

If a service request is received from user equipment one or more resource blocks are allocated to the user equipment in step 340 to enable communication of the user equipment with the operator's network via the Femtocell base station. The allocation of the resource blocks is notified to the local resource managing Femtocell base station in step 350, so that the local resource managing Femtocell base station can update the resource usage table accordingly. In steps 360 and 370 a check is performed to determine whether or not the local resource managing Femtocell base station has acknowledged the notification of the resource block allocation. Once this notification has been received the Femtocell base station starts to monitor its channels in step 380 for the receipt of expected periodic measurement reports from the user equipment. If no such measurement reports are received it is determined in step 390 whether the service request of the user equipment has been completed. Should this not be the case, monitoring for service reports continues in step 380. Otherwise the local resource managing Femtocell base station is notified of the completion of the service request in step 400, thereby enabling the local resource managing Femtocell base station to update the resource usage table to indicate that the resource block that had been used for the user equipment service request are no longer in use. Acknowledgement of the notification from the local resource managing Femtocell base station is again awaited in steps 410 and 420 and, following receipt of this acknowledgement, the process returns to step 320.

Should it be determined in step 380 that a periodic measurement report has been received from the user equipment, it is determined in step 430 if this report indicates bad performance, for example because of the presence of interference from another channel. Should the report indicate satisfactory performance, the method returns to step 380 to await the receipt of the next measurement report from the user equipment.

If the periodic measurement report from the user equipment, however, indicates that the performance is not satisfactory, then the local resource managing Femtocell base station is notified of the poor service in step 450 and its response is awaited in step 460. In step 470 commands received from the local resource managing Femtocell base station in the response are implemented in the receiving Femtocell base station and a notice of the completion of the implementation is again sent to the local resource managing Femtocell base station. A response to the acknowledgement is then awaited (steps 480 and 490) and, once received, the process returns to the monitoring for service requests from user equipment in step 320.

The reader will appreciate that the parts of the process illustrated by means of steps 320 onwards relate to the operation of the Femtocell base station relative to a single user equipment service request only. Femtocell base station may have the ability to parallel process a plurality of user equipment service requests and apply the steps of the FIG. 3 process following step 320 to a number of user equipment service requests. This part of FIG. 3 has nevertheless been limited to refer to a single user equipment service request only to improve the clarity of illustration.

It will be appreciated from the above that the algorithm described with reference to FIG. 3 incorporates a number of features that may also be operated independently from each other. In the FIG. 3 algorithm, the neighbouring list is, for example, provided by the network operator. In an alternative arrangement, however, each Femtocell base station may create its own neighbouring list in an autonomous fashion, as described in more detail below.

The FIG. 3 algorithm parameters for establishing the control channel are moreover received from the network operator. The Femtocell base stations may alternatively establish a communicative link with neighbouring Femtocell base stations in an autonomous fashion (that is without input from the network operator). A Femtocell base station that is arranged to also operate in a WLAN infrastructure mode, for example, can communicate on the unlicensed spectrum and establish the control channel thereon without requiring input form the network operator.

Providing the control channel discussed above with reference to FIG. 3 (as well as the control channel that will be discussed in more detail below with reference to FIGS. 6 and 8) enables communication between Femtocell base stations, so that attempts to overcome an interference, that may, for example, be experienced by user equipment operating within an area covered by one or more of the Femtocell base stations, can take not only the operating conditions of a single Femtocell base station into account (as is the case for known systems comprising a plurality of Femtocell base stations) but the conditions governing the operation of a plurality or all of the Femtocell base station in communicative contact with each other via the control channel.

It was realised that, if Femtocell base station that can interfere with each other independently decide to reduce transmit power in an attempt to reduce interference the Femtocell base station itself may experience degraded performance. Independently acting Femtocell bases stations may thus be configured not to address interference problems that do not affect their own performance.

It can be envisaged that two regions, each being managed by one Femtocell base station acting as a local resource manager, overlap so that one Femtocell base station can receive control commands from both of the local resource managers (e.g. in step 460). As the two local resource managers may not communicate with each other, the received commands may not be the same or may even be conflicting. The Femtocell base stations may be arranged to sequentially execute such commands. If the first commands successfully overcomes an interference situation, then the second command may not be executed and simply ignored.

It will be appreciated that a Femtocell base station that does not fulfil the function of a local resource manager does not need to be aware of the identities of the other Femtocell base stations that are under the management of the local resource manager.

a Femtocell base station is located in an region that can communicate with two Femtocell base stations that act as local resource managers FIG. 4 shows a resource usage table as it may be maintained in the local resource managing Femtocell base station. As can be seen from FIG. 4 the table has one column dedicated to each available resource block, with all available resource blocks being listed in the columns of the table. Each line of the table relates to one of the Femtocell base stations managed by the local resource managing Femtocell base station. This of course includes the local resource managing Femtocell base station as well as any base stations that have later authenticated themselves with the operator's network, discovered the resource managing Femtocell base station and hence are communicatively coupled to the Femtocell base station. As can be seen from the table in FIG. 4, a record of the use of each resource block by the Femtocell base stations is kept. While each resource block may only be used by a single Femtocell base station it can also be seen that some resource blocks are used by more than one Femtocell base station. It can, for example, be seen that resource block RB 0 is used by Femtocell base station 1 (Femto 1) as well as by Femtocell base station 3 (Femto 3). It is likely that resource blocks are simultaneously used by more than one Femtocell base station, in particular during times of high communication traffic levels, given that in the process shown in FIG. 3 the Femtocell base stations autonomously allocate resource blocks when initially responding to a user equipments service request. Such simultaneous use of a resource block is not only acceptable, given that in many cases it is unlikely to create any interference or other performance degradation due to the difference in coverage area of different Femtocell base stations, but also desirable as it increases the bandwidth available from the managed Femtocell base stations. The interference management method described above with reference to steps 300 and 310 of FIG. 3 provides a way of improving the performance experienced by a user equipment service request that may be caused by the simultaneous use of a resource block by two or more Femtocell base stations.

When the local resource managing Femtocell base station receives a notification from a Femtocell base station of the allocation of a resource block in step 280 shown in FIG. 3 the local resource managing Femtocell base station updates the table shown in FIG. 4 by changing the table entry relating to the notifying Femtocell base station and the resource block that has been notified as having been newly allocated from "0" to "1". Equally, should the local resource managing Femtocell base station receive a notification that the use of a resource block has ceased, such as, for example, a notification sent in step 400 of FIG. 3, then the local resource managing Femtocell base station changes the corresponding entry in the table from "1" to "0".

It will be appreciated that the knowledge of the local use of the various resource blocks in the local resource managing Femtocell base station enables the local resource managing Femtocell base station to determine the likely source of an interference. The local resource managing Femtocell base station may, for example, determine if a resource block that experiences interference is used by a Femtocell base station other than the Femtocell base station providing service to the user equipment experiencing the interference. If it is found that this is the case, then one of the Femtocell base stations currently using the resource block may be instructed, for example in step 310 of FIG. 3, to use a different resource block.

Turning now to another embodiment, it has been discussed above that a Femtocell base station can generate its own neighbouring list. An example of such a neighbouring list is shown in FIG. 5A. As can be see from this figure, the neighbouring list comprises a number of IDs of the neighbouring Femtocell base stations from which the Femtocell base station maintaining the list can receive messages. In the second column of the list an indication of the strengths of the signals received from the individual neighbouring Femtocell base stations is provided. In the neighbouring list 300 the neighbouring Femtocell base stations are arranged in the order of descending signal strength, so that the neighbouring Femtocell base station with the strongest signal appears first in the list and the neighbouring Femtocell base station with the weakest received signal appears last in the list. It will be appreciated that the stronger the signal received from the neighbouring Femtocell base stations, the more likely it is that the neighbouring Femtocell base station is the source of an interference. The neighbouring list shown in FIG. 5A thus provides a useful indication of likely interferers. It will moreover be appreciated that the order of the list is not essential. The neighbouring list may, for example, remain unordered or may list the neighbouring Femtocell base stations in an order different from the order shown in FIG. 5A, for example in order of ascending signal strength.

FIG. 5B shows another, more detailed example of a neighbouring list. The two leftmost columns of this list correspond to the two columns of the neighbouring list shown in FIG. 5A. In addition to the information provided in the list shown in FIG. 5A, the neighbouring list shown in FIG. 5B also comprises one column for each communication resource (in this case resource block) available to the Femtocell base station maintaining the list for data transmission. The processor 150 shown in FIG. 2 notes the allocation of a resource block for data transmission, either if the processor 150 itself allocates such a resource block for data transmission or if the Femtocell base station maintaining the list receives a notification from a neighbouring Femtocell base station indicating that the neighbouring Femtocell base station has allocated a listed resource block for data transmission. As can be seen from FIG. 5B, the allocation of a resource block can be indicated by entering a simple "1" in the list, so that only one bit of memory space is required to track the allocation of each resource block for each of the neighbouring Femtocell base stations as well as for the Femtocell base station that maintains the list.

It will be appreciated that the list shown in FIG. 4 could be maintained alongside the list shown in FIG. 5A so that the combined information content of these two lists corresponds to that of the list shown in FIG. 5B. It will be appreciated that knowledge of the communication resources that have been allocated to communication processes by neighbouring Femtocell base stations allows to avoid collision/the introduction of interference. Such knowledge thus provides an advantage over known Femtocell base stations that allocate transmission resources without knowledge of the activities of neighbouring Femtocell base stations. Similarly, a known (isolated) Femtocell base station may decide to reduce its transmit power in light of a notified interference. If this is done without coordinating with the interfering entity, the Femtocell base station may continue to experience degraded performance if the interfering entity does not adapt.

Figures 6, 7:
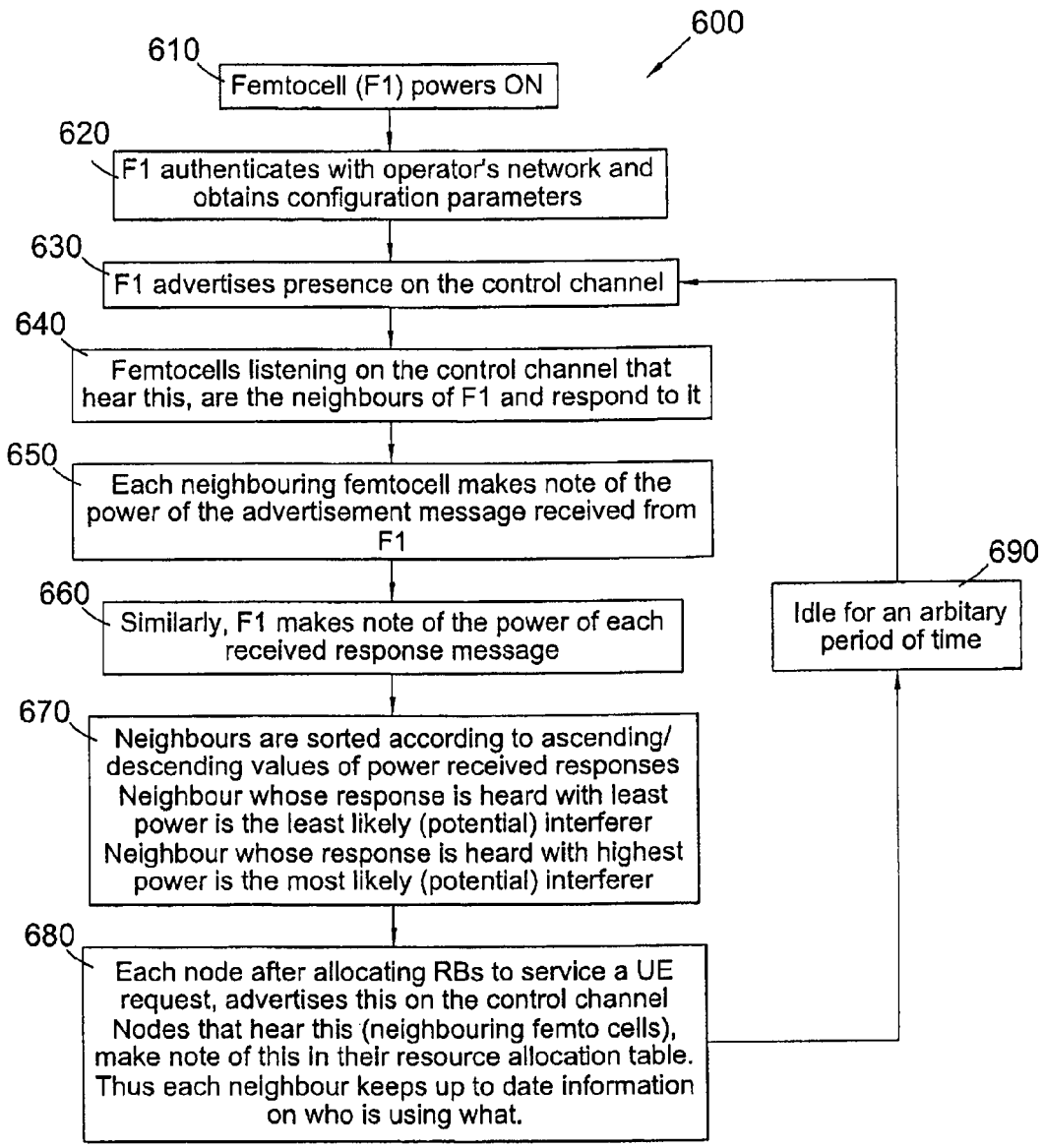
FIG. 6 shows an algorithm for creating a neighbouring list.
FIG. 7 shows an example of an interference list.

FIG. 6 shows a flowchart 600 for generating a neighbouring list, such as the neighbouring list shown in FIG. 5A. After powering on in step 610, authenticating with the operator's network and receipt of configuration data in step 620, the Femtocell base station advertises its presence to other Femtocell base stations that may be within transmission range via a control channel established for this purpose (the operating parameters for establishing this control channel may be received from the operator's core network in step 620). The control channel is shared by other Femtocell base stations that have authenticated themselves in a fashion similar to that of step 620 with the network operator. These Femtocell base stations listen for information traffic on the control channel and, if they receive the message the Femtocell base station has sent in step 630, send a response to the received message. Neighbouring Femtocell base stations also make a note of the signal strength of the message sent in step 630, for example for entry in a list such as the list shown in FIGS. 5A and 5B. Femtocell base stations may alternatively be arranged to send regular or frequent beacons without expectation of a response from other Femtocell base stations. All beaconing Femtocell base stations in a system can be included in a neighbouring list as long as the regular or frequent beacons are received and excluded from the neighbouring list once receipt of the beacons has stopped. The time intervals at which any such beacons may be transmitted may be predetermined in the Femtocell base station or may be changed later, for example during use.

The Femtocell base station that has transmitted the message in step 630 similarly listens for any responses from neighbouring Femtocell base stations and, if received, detects and stores an indication of the signal strength of a received reply message in step 660. Replies from neighbouring Femtocell base stations are sorted by signal strength in step 670, as discussed above.

The control channel is further utilised by the Femtocell base stations to advertise the allocation of a resource block to data communication, for example with user equipment. Nodes receiving such allocation messages can enter the received information in a table, such as the table shown in FIGS. 4 and 5B, to keep track of those resource blocks that are already being used. De-allocation of resource blocks can equally be advertised by the Femtocell base stations, so that neighbouring Femtocell base station can update their respective resource allocation lists to indicate a newly available resource block as being free.

After an arbitrary period of time the Femtocell base station may again advertise its presence on the control channel in step 690, although doing so may not be mandatory. Performing such a repeated advertisement is advantageous as it confirms that the Femtocell base station has not been deactivated. It will be appreciated that the algorithm illustrated by FIG. 6 enables a network of Femtocell base stations to keep up to date information regarding its neighbouring Femtocell base stations. This includes an ability of the Femtocell base station to readily adapt to the addition of further Femtocell base station or to the removal of a Femtocell base station.

It will moreover be appreciated that the above discussed distributed approach to generating a neighbouring list is practicable for networks comprising a large number of Femtocell base stations, as there is no requirement for interaction with the network operator in generating the neighbouring list. The bandwidth a network operator may make available for the configuration of Femtocell base stations is thus not used for generating the neighbour list and cannot therefore impose an upper limit on the number of Femtocell base stations in the network. Expressed more generally, the resource management burden on the network operator is reduced. As the neighbouring list is moreover generated by a wireless interaction between neighbouring Femtocell base stations the network operator's core network is moreover not overwhelmed by management traffic associated with the generation of the neighbouring lists.

Upon identifying interference the Femtocell base station may take steps to mitigate or eliminate the interference and/ or, avoid allocating the communications resource/resource block to communications starting within a predetermined time from the receipt of the notification.

The Femtocell base station may note the interference notification in an interference list. An example of such an interference list is shown in FIG. 7. As can be seen from FIG. 7, the interference list can be a simple bit map that comprises one bit for each of N available resource blocks. If the Femtocell base station maintaining the interference list receives a notification of an interference, then the processor 150 can change the state of the bit corresponding to the resource block from "0" to "1" to indicate that the resource block in question experiences an interference.

Figure 8:
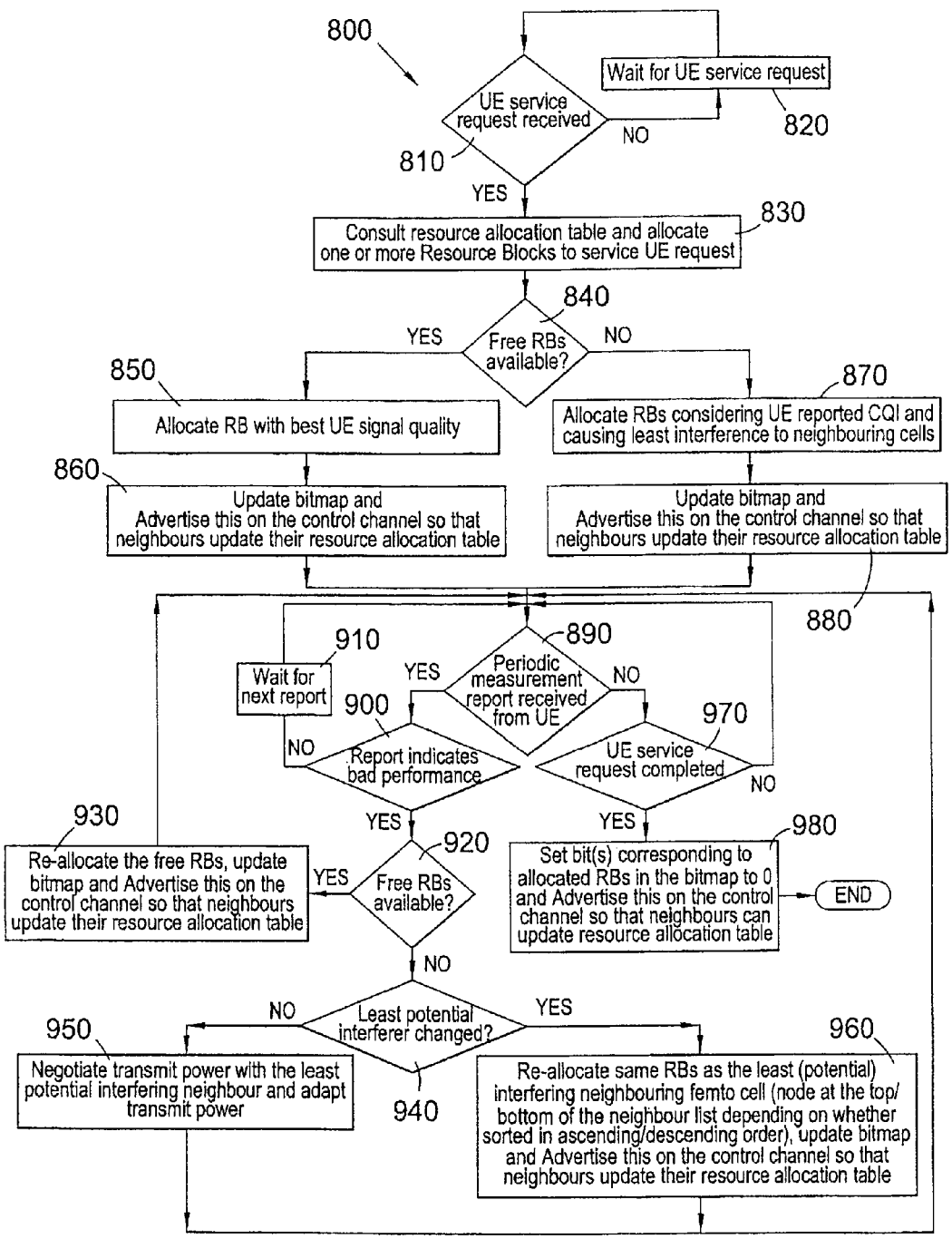
FIG. 8 shows an algorithm that may be followed by a Femtocell base station on receipt of a service request from user equipment.

Turning now to FIG. 8, FIG. 8 shows an algorithm 800 for operating a distributed resource allocation mechanism. In an initial step 810 the Femtocell base station operating its local version of the resource allocation mechanism checks if a service request has been received from user equipment and, should this not be the case awaits receipt of such a request in a loop created by waiting step 820. Following the receipt of a service request from user equipment the Femtocell base station checks a resource allocation table (discussed above with reference to FIGS. 4 and 5B) for free resource blocks that could be allocated to the service request. Should any resource blocks be free, the resource block for which the user equipment experiences the best signal quality is allocated to the communication with the user equipment in step 850. The resource allocation table is then updated to reflect the new allocation of the resource block and this new allocation is moreover advertised to the neighbouring Femtocell base stations via the control channel in step 860.

Should it be found in step 840 that no resource blocks are free, then the Femtocell base station considers, in step 870 and based on a measurement report from the user equipment and on the above discussed resource allocation list, which resource block to allocate for communication with the user equipment. The processor 150 may, for example, preferentially allocate those resource blocks used by a neighbouring Femtocell base station with low signal strength (as per the neighbouring list of FIG. 5A or 5B) to minimise the danger of causing interference. Following the allocation of the resource block, the resource allocation table is again updated, in step 880, and the allocation is notified to other Femtocell base stations. It will be appreciated that the allocation of the resource blocks can also look to the above discussed interference list and avoid allocating resource blocks that are known to already suffer from interference.

Once a resource block has been allocated for the communication with the user equipment, the Femtocell base station enables communication of the user equipment with the operator's network and monitors for receipt of periodic measurement reports in step 890. If such measurement reports are received at the Femtocell base station, and any such report is not determined in step 900 to not indicate unsatisfactory performance, then the Femtocell base station simply continues waiting for the next one of the periodic reports in step 910. Should a received report, however, indicate that performance is not satisfactory, then the algorithm moves on to step 920, in which the resource allocation table is investigated to determine if there is a free alternative resource block that could be used for the communication session. Should this be the case the resource blocks are reallocated, so that the free resource block is used in future. The resource allocation table is updated to reflect this reallocation in step 930 and the reallocation is also notified to the neighbouring Femtocell base stations in the above described manner. The Femtocell base station may introduce a delay between steps 920 and 930. This delay may have a random length, so that two Femtocell base stations of the same type are unlikely to act simultaneously. Following the delay the receipt of a further periodic measurement report may be awaited to determine whether or not performance has been improved by another (faster action or less delayed) Femtocell base station. Should it be found that performance has been improved to a satisfactory level, then step 930 may not be needed and the algorithm can instead return to step 890.

If it is determined in step 920 that no spare resource blocks are available, then a resource block that is already being used by a neighbouring Femtocell base station is used instead of the resource block that is currently in use. For this purpose it is determined which of the neighbouring Femtocell base stations is the least potential interferer in step 940. This can be done by considering the signal strength information in the neighbouring list of FIG. 5A. The least potential interferer is the neighbouring Femtocell base station for which the lowest signal strength has been measured. In the table shown in FIG. 5A this is the Femtocell base station that is last in the list.

Once the least potentially interfering Femtocell base station has been identified the Femtocell base station operating the algorithm 800 of FIG. 8 negotiates the transmit power the Femtocell base station implementing the algorithm 800 of FIG. 8 uses for the resource block in question and the transmit power used by the least potentially interfering Femtocell base station uses for the resource block in question. If the least potentially interfering Femtocell base station has not changed since the receipt of the service request from the user equipment and no resource blocks were initially available for allocation to the service request, then the resource block used is the same as the resource block used by the least potentially interfering Femtocell base station. In this case the selected resource can be used further and the Femtocell base station operating the algorithm 800 of FIG. 8 negotiates, in step 950, the transmit power with the least potentially interfering Femtocell base station that both base stations use for communication using the resource block in question. If the least potentially interfering Femtocell base station has changed, then the resource block used by the Femtocell base station operating the algorithm 800 and the resource block that is least likely to cause interference differ from each other. In this case the resource block used for communicating with the Femtocell base station is changed to the resource block used by the least interfering Femtocell base station and the transmit power used by both Femtocell base station for transmission using the newly selected resource block is negotiated and adopted in step 960.

If it is determined in step 890 that no periodic measurement reports are received from the user equipment, then it is checked in step 970 whether or not the user equipment's service request has been completed. Should this not be the case, then the algorithm simply returns to step 890 to await the next periodic measurement report. If the service request has been terminated, then the resource allocation table is updated in step 960 to reflect that the resource block used for the service request has been freed (e.g. by setting the corresponding bit in FIG. 5B to "0"). The Femtocell base station moreover broadcasts the fact that this resource block is no longer in use to the neighbouring Femtocell base stations via the control channel.

It will be appreciated from the above that the Femtocell base stations can act as a standalone device that does not need to share backup services with other Femtocell base station to create the neighbouring list, an interference list or a resource allocation list. A system comprising a number of the above described Femtocell base stations can thus be a fully distributed system, in particular a system that does not require the use of a centralized server to coordinate or store information on the geography of the Femtocell base stations.

Turning now to the manner in which neighbouring Femtocell base stations communicate with each other, as discussed above, the Femtocell base station establish a control channel through which the relevant information/messages can be exchanged. The information/messages can be exchanged periodically or upon start-up. If the exchange is periodical, then each Femtocell base station periodically announces its presence, so that the neighbouring Femtocell base stations within range can update their neighbouring lists appropriately. It can be envisaged that, if a network of Femtocell base stations is operated in this manner, each Femtocell base station may automatically delete another Femtocell base station from its neighbouring list if no message indicating the continuing presence of the other Femtocell base station is received for a predetermined period of time. This period of time may be longer than a single period required for receipt of such a message and may be longer than two such periods to allow for loss of one of the scheduled messages. Alternatively the Femtocell base station can advertise their presence only upon power up. In this case each Femtocell base station retains information of the presence of neighbouring Femtocell base stations in its memory.

The Femtocell base station may further announce the communication resource they use to the neighbouring Femtocell base stations. This can again be done by periodical transmission of a list of the resource blocks used (in which case the resource blocks for which no periodic notification is received after some time can be marked as free). Alternatively the use of a resource block can be announced to the neighbouring Femtocell base station once the use has commenced. In this case the Femtocell base station may send a separate announcement informing neighbouring Femtocell base stations once the resource block is no longer in use. Each node that receives a message can rank the neighbouring node from which the message was received based on the attributes of the received message.

Turning now to the establishing of a control channel by the Femtocell base station in situations where the network operator does not provide the operating parameters for such a control channel, one problem in implementing the control channel is contention, as the deployed Femtocell base stations are uncoordinated, as least prior to the establishing of the control channel. One way of limiting incidences of collision is to use a carrier-sense multiple access scheme (CSMA). Implementing a CSMA scheme in practice requires only a relatively simple protocol. In all but the most pathological scenarios and deployments a straightforward solution is likely to deliver a workable system provided that the occasional missing piece of knowledge is expected and catered for.

A distributed broadcast mechanism may alternatively be implemented. The IEEE 802.11 WLAN system, for example, allows each device in the basic service set to take turns (on a probabilistic basis) to send a broadcast beacon.

In the WiMedia/IEEE 802.15.3a (WiMedia-Alliance, "Standard ECMA-368 High Rate Ultra Wideband PHY and MAC Standard," ed. Geneva: Ecma International (Ecma), 2005) a more distributed approach is adopted (also to support the distributed resource reservation system) in which the beacon phase of the repeating super-frame includes a series of slots to allow each member device to broadcast its own "mini beacon" advertising its resource reservation. A newly joining device takes the next available beacon slot. Mechanisms are defined within the standard to deal with beacon clashes (e.g. as a result of two newly arriving devices, or a device hidden from another, choosing the same slot). Such an approach has also been documented in the EPRMA protocol (J. del Prado Pavon, et al., "The MBOA-WiMedia specification for ultra wideband distributed networks," IEEE Communications Magazine, vol. 44, pp. 128-134, June 2006). This offers another possible solution.

One way of determining the potential of a neighbouring Femtocell base station to interfere is measuring the strength of a signal received from the Femtocell base station, as discussed above. The neighbouring Femtocell base stations can be ranked in ascending/descending order of received power to identify likely interferers. To allow such ranking the Femtocell base stations may use a standard/predetermined power level for transmission on the control channel. In general, based on these measurements and other available information such as feedback from user equipment, the base stations will allocate frequencies in the manner which will best satisfy a predetermined criterion. An example of such a criterion is minimizing interference to neighbouring cells, or a balance of maximizing throughput and minimizing interference. The latter criterion can be expressed as:

$$\underset{i}{\operatorname{argmax}} \alpha \gamma_i + (1-\alpha) \frac{\Gamma}{\sum_{k=1}^{N} a_k \delta_{k,i}}$$

where $\alpha$ is the regularization parameter that may be used for either emphasising signal quality or reducing interference, $\gamma_i$ is the signal strength of the ith resource block which is fed back by the user equipment, $\Gamma$ is a scaling constant, chosen to prevent the second term for unduly influencing the sum. If for example, weak signals are received from all neighbouring Femtocell base stations, then the second term may become large, causing the selection of a resource block with poor quality. The use of the scaling constant $\Gamma$ helps to avoid this danger. $a_k$ is the signal strength from the kth neighbouring node (out of N neighbours) or a normalised signal strength from the kth neighbouring node, and $\delta_{k,i} \in \{0, 1\}$ is the assignment indicator of resource block i at the kth neighbouring node.

It will be appreciated that the above description of specific embodiments has been made by way of example only and that this description is not intended to be a limiting one. It will be appreciated that some modification to the arrangements described with regard to the figures are possible. It is, for example, envisaged that local resource managing Femtocell base stations or any of the Femtocell base stations operating in the above described distributed arrangement may also keep a record of previous interference problems, of the steps taken in an attempt to rectify such problems and of whether or not taking these steps has improved performance. A record of this type can provide an indication of likely interference pattern between Femtocell base stations. Such a record may help in reliably determining which interference pattern is being experienced in a new interference notification and may thus be useful in expediently finding a manner in which such a new interference can be reduced or removed.

In the above described embodiment the local resource managing Femtocell base station sends instructions/commands for the re-allocation of resource block. In an alternative arrangement the local resource managing Femtocell base station may instead or additionally send a policy by which the receiving Femtocell base has to structure resource allocation.

While certain embodiments have been described, the embodiments have been presented by way of example only, an area not intended to limit the scope of the inventions. Indeed, the novel methods, apparatus and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A Femtocell base station configured to communicate with one or more Femtocell base stations in a communication network using a control channel for exchange of control information, the control channel established via an air interface, and the Femtocell base station configured to act as a central resource manager to co-ordinate a response to an interference event experienced within an area of coverage of another Femtocell base station in the communication network by being configured:
to receive interference notifications from the other Femtocell base station via the control channel,
to determine, using a record of resource blocks that have been allocated by other Femtocell base stations, an action for reducing or eliminating an interference notified in the interference notification, and
to send an interference remedial command to at least one of the other Femtocell base station and one or more further Femtocell base stations in the communications network via the control channel, wherein the interference remedial command is a command for execution by at least one of the other Femtocell base station and the one or more further Femtocell base stations that, when executed by the other Femtocell base station and/or by the one or more further Femtocell base stations, puts the action into effect,
wherein the action includes changing an allocation of a resource block by the other Femtocell base station and/or by the one or more further Femtocell base stations or altering a transmit power used by the other Femtocell base station and/or by the one or more further Femtocell base stations.

2. A system comprising:
a plurality of Femtocell base stations, all in communicative contact with each other via a communication network;
a first Femtocell base station configured to act as a central resource manager and to communicate with other Femtocell base stations in the plurality of Femtocell base stations using a control channel for exchange of control information, the control channel established via an air interface, the first Femtocell base station further configured to receive an interference notification from another Femtocell base station via the control channel, and to co-ordinate a response to an interference event experienced within an area of coverage of the another Femtocell base station in the communication network; and
a second Femtocell base station;
wherein the first Femtocell base station is further configured to determine, using a record of resource blocks that have been allocated by other Femtocell base stations in the communication network, an action for reducing or eliminating an interference notified in the interference notification and to send a message, comprising a command to the second Femtocell base station via the control channel to put the action into effect,
the action including changing an allocation of a resource block by the second Femtocell base station or altering a transmit power used by the second Femtocell base station.

3. A system according to claim 2, the first Femtocell base station further configured to receive messages identifying an interference in data transmission.

4. A method of managing interference in a system comprising a plurality of Femtocell base stations all in communicative contact with each other via a communication network, the method comprising:
receiving, by a first Femtocell base station configured to act as a central resource manager and configured to communicate with other Femtocell base stations in the plurality of Femtocell base stations using a control channel for exchange of control information, the control channel established via an air interface, interference notifications from the other Femtocell base stations via the control channel;
co-ordinating a response to an interference event experienced within an area of coverage of another Femtocell base station in the communication network;
determining, in the first Femtocell base station using a record of resource blocks that have been allocated by other Femtocell base stations, an action for reducing or eliminating the interference event; and
sending a message from the first Femtocell base station to another Femtocell base station in the communication network, the message comprising a command for execution by the other Femtocell base station, the command when executed by the other Femtocell base station putting the action into effect,
wherein the action includes changing an allocation of a resource block by the other Femtocell base station or altering a transmit power used by the other Femtocell base station.

5. A method according to claim 4, further comprising determining a source of interference using a record of resource blocks that have been allocated by the plurality of Femtocell base stations.

6. A method according to claim 4, further comprising:
receiving at the other Femtocell base station the message comprising a command that, when executed in the Femtocell base station, puts into effect the action causing a change in at least one of an allocation of resource blocks within the Femtocell base stations and a transmit power level used for communicating with user equipment; and
executing the command in the other Femtocell base station.

* * * * *